(12) United States Patent
Aubry et al.

(10) Patent No.: US 11,187,671 B2
(45) Date of Patent: Nov. 30, 2021

(54) DETECTION SENSOR HAVING A SENSOR CELL WITH A HIGH-ELECTRON MOBILITY TRANSISTOR AND RING RESONATOR(S)

(71) Applicants: CENTRE NATIONAL DE LA RECHERCHE SCIENTIFIQUE, Paris (FR); GEORGIA TECH LORRAINE, Metz (FR)

(72) Inventors: Vincent Aubry, Orsay (FR); Abdallah Ougazzaden, Marly (FR); Jean-Paul Salvestini, Metz (FR); Paul Voss, Metz (FR); Yacine Halfaya, Metz (FR)

(73) Assignees: CENTRE NATIONAL DE LA RECHERCHE SCIENTIFIQUE, Paris (FR); GEORGIA TECH LORRAINE, Metz (FR)

( * ) Notice: Subject to any disclaimer, the term of this patent is extended or adjusted under 35 U.S.C. 154(b) by 221 days.

(21) Appl. No.: 16/341,822

(22) PCT Filed: Oct. 16, 2017

(86) PCT No.: PCT/EP2017/076379
§ 371 (c)(1),
(2) Date: Apr. 12, 2019

(87) PCT Pub. No.: WO2019/076437
PCT Pub. Date: Apr. 25, 2019

(65) Prior Publication Data
US 2020/0278315 A1  Sep. 3, 2020

(51) Int. Cl.
*G01N 27/414* (2006.01)
*H01P 7/08* (2006.01)

(52) U.S. Cl.
CPC ......... *G01N 27/4141* (2013.01); *H01P 7/082* (2013.01)

(58) Field of Classification Search
CPC .. G01N 27/4141; G01N 27/414; H01P 7/082; G01M 15/102
See application file for complete search history.

(56) References Cited

U.S. PATENT DOCUMENTS

| 9,927,675 B2 | 3/2018 | Huang et al. |
| 2017/0279410 A1* | 9/2017 | Zhang .................... H03C 7/025 |

FOREIGN PATENT DOCUMENTS

| CN | 104614403 A | 5/2015 |
| FR | 3056751 A1 | 3/2018 |

OTHER PUBLICATIONS

Singh et al. ("Design of Nanostructured Graphene Based RF Complementary Split Ring Resonator Gas Sensor for Detection of Nitrogen Dioxide," 2017 IEEE MTT-S International Microwave and RF Conference "IMaRC", pp. 47-49, 2017) (Year: 2017).*

(Continued)

*Primary Examiner* — Yasser A Abdelaziez
(74) *Attorney, Agent, or Firm* — Greer, Burns & Crain, Ltd.

(57) ABSTRACT

A wireless sensor for detection or measurement of at least one specific component present in a gaseous or liquid mixture, the gas sensor including at least one sensor cell, having a high-electron-mobility transistor having a source and a drain with a gate intercalated between source and drain. The at least one sensor cell having a high-electron-mobility transistor is associated with at least one split-ring resonator with at least one respective slit and connected between, on the one hand, the drain and on the other hand, the gate or the source of the at least one sensor cell, the sensor detecting a change in the intensity or the frequency of resonance as a function of the presence and/or of the concentration of the at least one specific component in the gaseous or liquid mixture.

10 Claims, 3 Drawing Sheets

(56) References Cited

OTHER PUBLICATIONS

Zhang et al. ("Large phase modulation of THz wave via an enhanced resonant active HEMT metasurface," Nanophotonics, 8(1), pp. 153-170, Nov. 27, 2018) (Year: 2018).*
International Search Report from International Patent Application No. PCT/EP2017/076379, dated Jun. 5, 2018.
Bishop et al.,"Experimental Study and Device Design of NO, NO2, and NH3 Gas Detection for a Wide Dynamic and Large Temperature Range Using Pt/AlGaN/GaN HEMT", IEEE Sensors Journal (2016), 16(18), pp. 6828-6838.
Kim et al.,"A Gas Sensor Using Double Split-Ring Resonator Coated with Conducting Polymer at Microwave Frequencies", IEEE Sensors Proceedings (2014), pp. 1815-1818.

* cited by examiner

DETECTION SENSOR HAVING A SENSOR CELL WITH A HIGH-ELECTRON MOBILITY TRANSISTOR AND RING RESONATOR(S)

BACKGROUND

The invention relates to a wireless sensor for detection or measurement of a specific component present in a gaseous or liquid mixture, the wireless sensor comprising a sensor cell having a high-electron-mobility transistor and at least one ring resonator.

A high-electron-mobility transistor, also known by the acronym HEMT, comprises a source and a drain with a gate intercalated between the source and the drain. The operation of the sensor cell is based on the conductance between two ohmic contacts represented by the source and the drain, by the electrostatic activity of a control electrode, represented by the gate.

Hereinafter, a preferential application of the wireless sensor according to the present invention will be described as a sensor for detection of a pollutant element present in the exhaust gases evacuated from an internal combustion engine by means of an exhaust line of a motor vehicle. This application is non-limitative of the present invention.

It is known that the exhaust gases from vehicles contain numerous chemical components, some of which are toxic to the health of persons, and some to the environment. In order to limit these pollutants for the environment and health, regulations have been introduced in Europe, the United States and Japan for measurement and/or detection of these chemical components.

With regard to the nitrogen oxides forming part of these dangerous chemical components, hereinafter denoted by their chemical formula NOx, the emission limits will become increasingly strict, and will probably be specific to the different nitrogen oxides, including NO, $NO_2$, $N_2O$, etc., whereas NOx are currently regulated overall.

The sensors currently used for vehicle exhaust gases are NOx sensors and $O_2$ probes, also known as lambda probes. They are based on the operation principle of solid electrolytes and Nernst's law, and are based on yttrium-doped zirconium oxide.

These NOx sensors are not selective between the different gases and detect an overall concentration corresponding to the gases $NO_2$, NO, $N_2O$, $NH_3$. In addition, their response time is high, and these sensors are relatively expensive.

Other different gas sensor technologies exist, such as optical sensors, metal oxide sensors, acoustic sensors, gravity sensors, etc. But, currently, there are no sensitive, rapid, low-cost sensors that are resistant to a vehicle exhaust system environment and selective of the different gaseous species such as $O_2$, $H_2$, $NO_2$, NO, $N_2O$, CO, $CO_2$.

A new generation of sensors that are selective between gases is therefore necessary in order to comply with this development in the regulations. In addition, a sensor making it possible to determine separately the concentration of ammonia or $NH_3$ and the $NO/NO_2$ ratio would make it possible to improve the regulation of a selective catalytic reduction system, also known by the abbreviation SCR, reducing the NOx by injection of $NH_3$ resulting from the decomposition of a reducing agent initially in the form of a urea-based mixture.

In this context, work has been carried out with respect to the development of gas sensors based on nitride (III-N) semiconductors. Semiconductors based on III-N materials are materials with a wide forbidden band, which makes them of interest for gas sensor applications. Their thermal stability and their high breakdown voltage make them suitable for high-temperature applications, which is the case for example for exhaust lines and/or internal combustion engines for motor vehicles.

The measurement of these sensors is carried out wirelessly. Such measurement of the exhaust gases with wireless sensors brings essential advantages. In fact, the environment of the exhaust gases is highly stressed in view of the very high temperatures encountered.

Eliminating the electrical contacts makes it possible to avoid the cost constraints associated with the necessary connectors. In addition, the performance of these connectors in the high-temperature environment can be the limiting factor in terms of temperature and not the capability of the sensor itself.

The wireless sensors can also operate in liquid environments or those that are difficult to access and can also make it possible to measure liquid contents. This also makes it possible to reduce the bulk of the sensors, which no longer require connectors.

However, the wireless sensors for measurement and/or detection of a component within a liquid or a gaseous mixture can be improved, in particular with respect to the selectivity to the component to be detected, which needs to relate to this component alone.

A high-electron-mobility transistor can be used in a field other than that for a sensor for measurement or detection of a component in a liquid or gaseous mixture. For example, document WO 20151188736 A1 describes a high-electron-mobility transistor that does not form part of a measurement sensor but is associated with a split-ring resonator acting on the modulation of the transistor.

Hitherto, no proposal has been made in the state of the art for making more selective detection or measurement of components in a gaseous or liquid mixture by such sensors.

Consequently, the problem that forms the basis of the present invention is, for a wireless sensor for detection and/or measurement of a component contained in a gaseous or liquid mixture, the sensor comprising a sensor cell having a high-electron-mobility transistor, to accurately detect and/or measure this component content selectively with respect to the other different components present in the gaseous or liquid mixture.

SUMMARY

In order to achieve this objective, a wireless sensor for detection or measurement of at least one specific component present in a gaseous or liquid mixture is provided according to the invention, the gas sensor comprising at least one sensor cell having a high-electron-mobility transistor comprising a source and a drain with a gate intercalated between source and drain, characterized in that said at least one sensor cell having a high-electron-mobility transistor is associated with at least one split-ring resonator with at least one respective slit and connected between, on the one hand, the drain and on the other hand, the gate or the source of said at least one sensor cell, the sensor detecting a change in the intensity or the frequency of resonance as a function of the presence and/or of the concentration of said at least one specific component in the gaseous or liquid mixture.

The technical effect is to obtain a wireless sensor of gas or liquid by incorporating at least one high-electron-mobility transistor associated with at least one split-ring resonator, advantageously at least two split-ring resonators. This split-ring resonator is a type of metamaterial, making it possible to take advantage of electromagnetic resonance.

This type of resonance is used in different types of electronic devices but has never been applied for sensors comprising a high-electron-mobility transistor or a diode known as a Schottky diode.

The split-ring resonator acts like a resonant circuit of the LC type, resonating at a specific frequency, which acts as a waveguide, blocking the electromagnetic transmissions at this frequency, unlike a closed-ring resonator that does not show a resonance frequency.

The split-ring resonator(s) are either connected with the source and the drain of the high-electron-mobility transistor in order to cause a variation in the resonance intensity or are connected between the source and the gate of the transistor causing a shift in the resonance frequency.

The second configuration has significant potential for increasing the sensitivity of the sensor, as a shift of 10 Mhz can be obtained, and this shift can thus be measured by very simple devices.

Advantageously, the intensity or the frequency of resonance is a function of one or more of the following parameters, alone or in combination:
- a dimension of said at least one slit of said at least one split-ring resonator,
- a dimension or dimensions of the material constituting said at least one split-ring resonator,
- when said at least one split-ring resonator has several slits, a number of slits for said at least one split-ring resonator and,
- when the sensor has at least two split-ring resonators, a number and position of the split-ring resonators with respect to one another.

Thus, by selecting one or more specific parameters, a sensor can be obtained that is selectively targeted on a component to be detected or to be measured with a specific intensity or frequency of resonance.

In a preferential embodiment of the present invention, the sensor has at least two split-ring resonators and said at least one sensor cell having a high-electron-mobility transistor is inserted into said at least one slit of said at least two split-ring resonators.

Advantageously, said at least one sensor cell having a high-electron-mobility transistor is inserted into said at least one slit of the innermost split-ring resonator of said at least two split-ring resonators.

In another preferential embodiment of the present invention, the sensor has at least two split-ring resonators and said at least one sensor cell having a high-electron-mobility transistor is inserted between said at least two split-ring resonators.

For the two preferential modes, i.e. a sensor cell having a high-electron-mobility transistor inserted either in a slit of a split-ring resonator or between at least two split-ring resonators, since the capacitance value of the sensor having a high-electron-mobility transistor varies as a function of the presence of the component, such a positioning of the high-electron-mobility transistor varies the resonance frequency of the structure with split-ring resonators.

In these modes, a small variation in the capacitance results in a wide frequency shift, which increases the measurement sensitivity of the sensor. These modes also have the advantage of only having contacts between, on the one hand, the transistor and rings structure, and on the other hand, the sensor.

Advantageously, said at least one sensor cell having a high-electron-mobility transistor is in the form of a crown concentric with said at least two split-ring resonators.

Advantageously, said at least one sensor cell having a high-electron-mobility transistor is rectangular or square in shape or as a portion of a crown.

Advantageously, the sensor has at least two concentric split-ring resonators while presenting a common centre and said at least one slit of said at least two split-ring resonators is/are aligned according to a diameter of the outermost split-ring resonator of said at least two split-ring resonators, the common centre of said at least two split-ring resonators being located intercalated, aligned between said at least one slit of the two split-ring resonators.

The invention also relates to an assembly of at least two wireless sensors for detection or measurement, each sensor detecting a respective specific component present in a gaseous or liquid mixture, characterized in that said at least two sensors are such as previously mentioned, each of said at least two sensors showing a change in intensity or frequency of resonance as a function of the presence and/or the concentration of the respective specific component of each sensor in the gaseous or liquid mixture.

Thus, indirect detection or measurement takes place, which can withstand temperatures that are higher than those tolerated in a current system with contacts. The fact of no longer having contacts makes it possible, for an identical surface, to increase the reaction surface area of the zone sensitive to the gases.

The sensors having a high-electron-mobility transistor can be designed so as to be sensitive to molecules of specific components on a single electronic chip with different respective tunings.

Finally, the invention relates to an exhaust line of an internal combustion engine of a motor vehicle, characterized in that it comprises such a sensor or such an assembly of at least two wireless sensors for detection or measurement, the gaseous or liquid mixture being formed by exhaust gases passing through the exhaust line and said at least one specific component or said at least two specific components being respectively a gas or gases contained in the exhaust gases, in particular gases the content of which is controlled by regulations, for example NOx.

The advantages of the solution proposed by the present invention are detection or measurement that is selective between the different components or pollutants present in the exhaust gases of the line, an improved response time and a reduction in the cost of detection or measurement.

BRIEF DESCRIPTION OF THE DRAWINGS

Other characteristics, aims and advantages of the present invention will become apparent on reading the following detailed description and in the light of the attached drawings given non-limitatively by way of example and in which.

DETAILED DESCRIPTION

Figure 1:
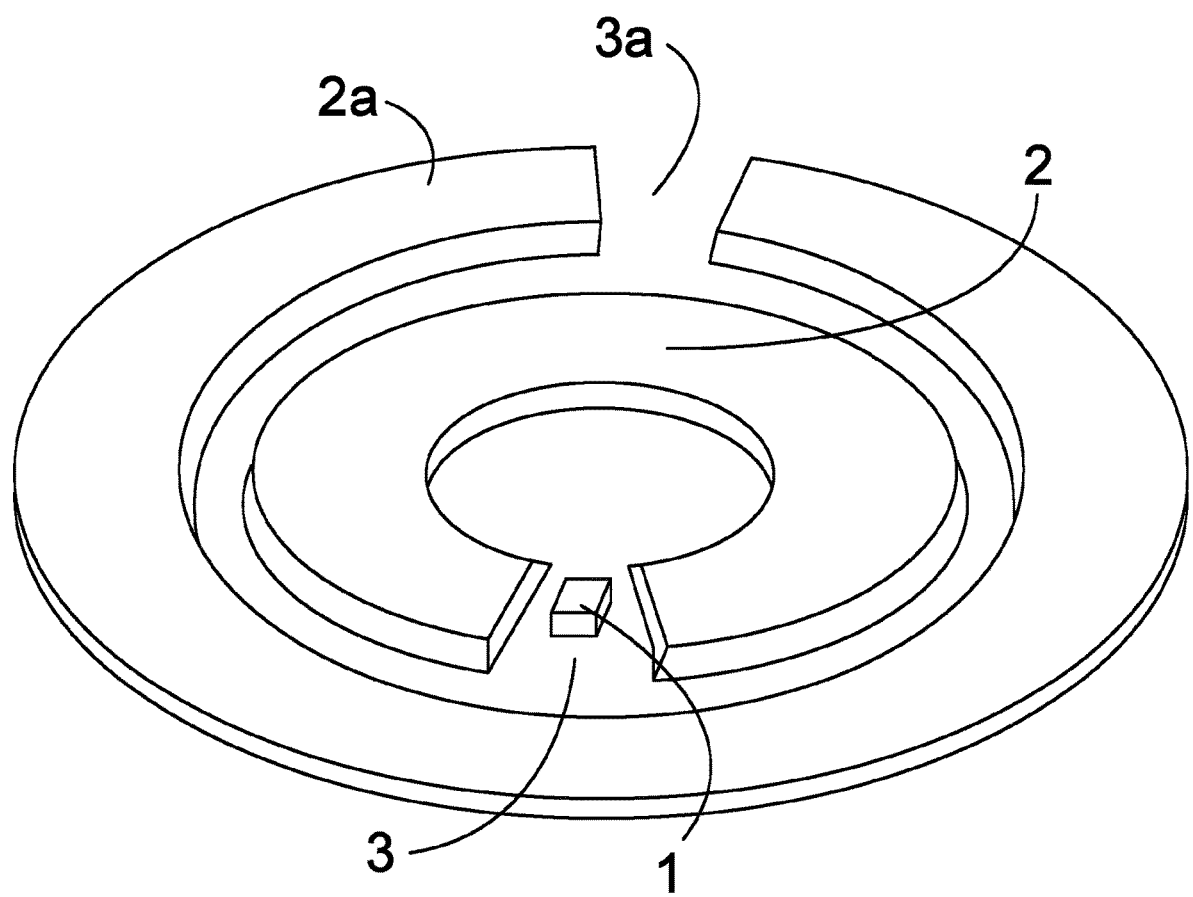
FIG. 1 is a diagrammatic representation of a first embodiment of a sensor according to the present invention, the sensor having, on the one hand, a sensor cell comprising a high-electron-mobility transistor and, on the other hand, two concentric split-ring resonators, the high-electron-mobility transistor being inserted into the slit of the innermost of the two split-ring resonators.

It should be remembered that the figures are given by way of example and do not limit the invention. They constitute diagrammatic representations of principle intended to facilitate understanding of the invention, and are not necessarily at the scale of practical applications. In particular, the dimensions of the different elements shown are not representative of reality.

Hereinafter, reference is made to all the figures taken in combination. With respect to recognition of the designated reference numbers, when reference is made to one or more specific figures, these figures are to be taken in combination with the other figures.

With reference to all of the figures, the present invention relates to a wireless sensor for detection or measurement of at least one specific component present in a gaseous or liquid mixture. The gas sensor comprises at least one sensor cell 1, 1a, having a high-electron-mobility transistor comprising a source and a drain with a gate intercalated between the source and the drain.

A high-electron-mobility transistor bears the drain and the source at two opposite lateral ends. In an embodiment, between the source and the drain a nanostructured III-N semiconductor layer and an $Al_{0.3}Ga_{0.7}N$ layer or active electrostatic interaction layer extend, the semiconductor layer being superimposed on the $Al_{0.3}Ga_{0.7}N$ layer.

The nanostructured 111-N semiconductor layer supports one or more layers forming an input gate for the ions of the component(s) to be detected or to be measured, for example dissociated negative oxygen ions $O^{2-}$ for nitrogen oxides NOx or oxygen $O_2$, by creating a potential difference. This layer or these layers forming an input gate, advantageously coated with a layer of oxides, can be made from platinum or tungsten.

Extending below the $Al_{0.3}Ga_{0.7}N$ layer is a gate linking the source and the drain, the gate being itself superimposed on a GaN layer, serving as an insulating substrate.

According to the invention, said at least one sensor cell 1, 1a having a high-electron-mobility transistor is associated with at least one split-ring resonator 2, 2a with at least one respective slit 3, 3a connected between, on the one hand, the drain and on the other hand, the gate or the source of said at least one sensor cell 1, 1a.

The sensor detects a change in intensity or frequency of resonance as a function of the presence and/or the concentration of said at least one specific component in the gaseous or liquid mixture.

A split-ring resonator 2, 2a is an artificially produced metamaterials structure. Such a split-ring resonator 2, 2a delivers a magnetic response or magnetic susceptibility creating a strong magnetic coupling necessary for an electromagnetic application and which was previously not available for conventional materials.

A split-ring resonator 2, 2a can be used alone or forming part of a structure of several split-ring resonators 2, 2a. Such a structure then comprises loops formed by each of the rings with divisions or slits 3, 3a in the loops. The ring or rings 2, 2a are made from a magnetic metal, such as for example copper, and in the case of a structure with several rings, keeping a gap between two adjacent rings. The ring or rings 2, 2a can be in the form of a crown or square or rectangular in shape.

A magnetic flux penetrating the ring or the split-ring resonators 2, 2a will induce rotating currents in the rings, which produce their own flux to enhance or oppose the incident field. The split-ring resonator(s) 2, 2a can be etched on a dielectric substrate.

The sensor can comprise one or more sensor cells. Each sensor cell 1, 1a can comprise one or more high-electron-mobility transistors associated with one or more split-ring resonators 2, 2a. Each ring resonator can be split once only or multiple times.

There is a variety of split-ring resonators 2, 2a, with periodic structures in the case of a structure having several rings. The rings 2, 2a can be nested, concentric, or surrounding one another without being concentric. The ring or rings 2, 2a can be in the form of a respective single split ring in spiral or helical form.

Advantageously, the intensity or the frequency of resonance is a function of one or more of the following parameters, alone or in combination:
   a dimension of said at least one slit 3, 3a of said at least one split-ring resonator 2, 2a,
   a dimension or dimensions of the material constituting said at least one split-ring resonator 2, 2a,
   when said at least one split-ring resonator 2, 2a has several slits 3, 3a, a number of slits 3, 3a for said at least one split-ring resonator 2, 2a and,
   when the sensor has at least two split-ring resonators 2, 2a, a number and position of the split-ring resonators 2, 2a with respect to one another.

Non-limitatively, for a structure of at least two split-ring resonators 2, 2a, the position can relate to the arrangement of the split-ring resonators 2, 2a with respect to one another, the arrangement of the slits 3, 3a of the split-ring resonators 2, 2a with respect to one another and/or the distance between the two split-ring resonators 2, 2a.

In a first embodiment of the structure of split-ring resonators 2, 2a, this first form being shown in FIG. 1, the sensor can have at least two split-ring resonators 2, 2a and said at least one sensor cell 1 having a high-electron-mobility transistor is inserted into said at least one slit 3 of one of said at least two split-ring resonators 2.

In this first embodiment, said at least one sensor cell 1 having a high-electron-mobility transistor can be inserted into said at least one slit 3 of the innermost split-ring resonator 2 of said at least two split-ring resonators 2, 2a.

Figure 2:
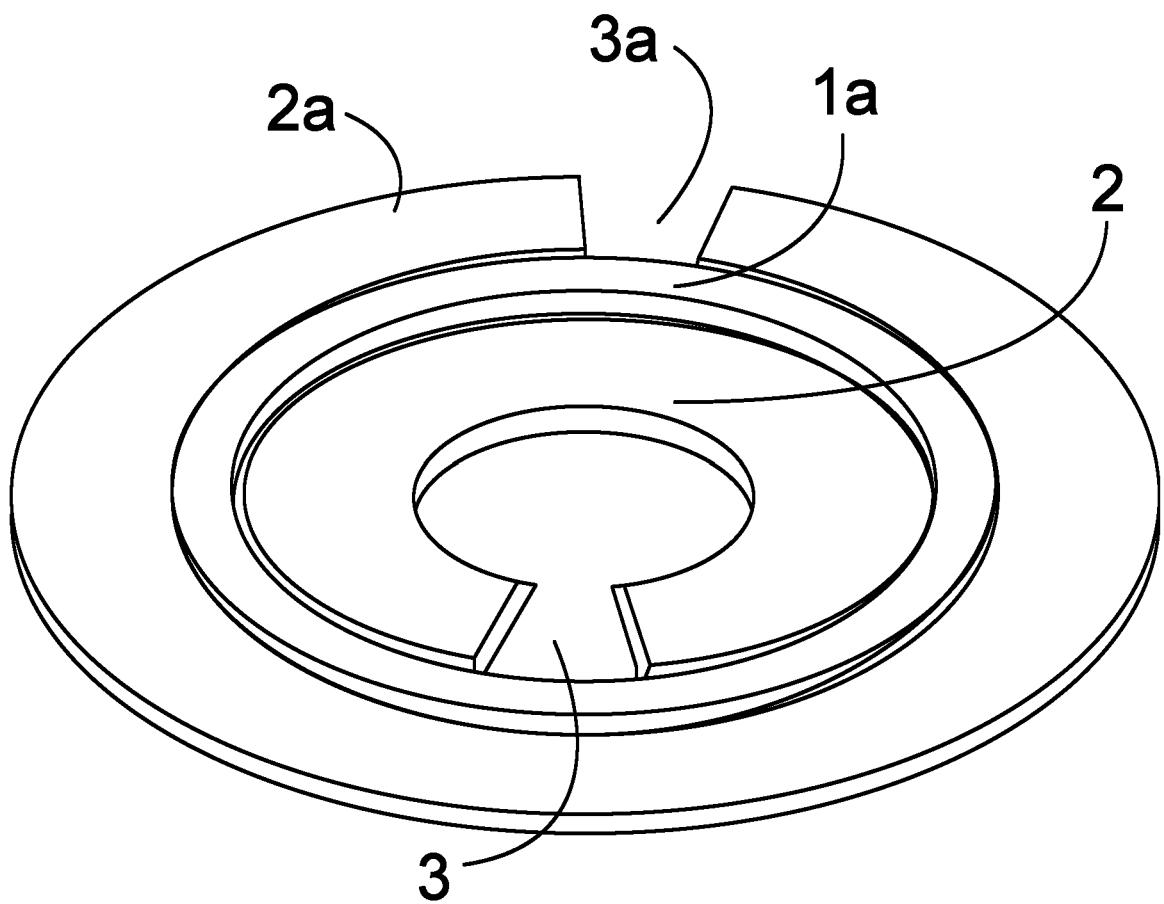
FIG. 2 is a diagrammatic representation of a second embodiment of a sensor according to the present invention, the sensor having, on the one hand, a sensor cell comprising a high-electron-mobility transistor and, on the other hand, two concentric split-ring resonators, the high-electron-mobility transistor being in the form of a crown inserted between the two concentric split-ring resonators.

In a second embodiment of the structure of split-ring resonators 2, 2a, this second form being shown in FIG. 2, the sensor can have at least two split-ring resonators 2, 2a and said at least one sensor cell 1a having a high-electron-mobility transistor can be inserted between said at least two split-ring resonators 2, 2a.

In this embodiment, said at least one sensor cell 1a having a high-electron-mobility transistor can be in the form of a crown concentric with said at least two split-ring resonators 2, 2a. The width of the crown formed by the sensor cell 1, 1a can influence the intensity or frequency of resonance of the sensor. The crown can be continuous or discontinuous.

Non-limitatively, for all embodiments, said at least one sensor cell 1, 1a having a high-electron-mobility transistor can be rectangular or square in shape or as a portion of a crown.

The sensor can have at least two concentric split-ring resonators 2, 2a having a common centre and said at least one slit 3, 3a of said at least two split-ring resonators 2, 2a are aligned according to a diameter of the outermost split-ring resonator 2a of said at least two split-ring resonators 2, 2a.

The common centre of said at least two split-ring resonators 2, 2a can be intercalated, aligned between said at least one slit 3, 3a of the two split-ring resonators 2, 2a.

According to the embodiments relating to the position of the sensor with respect to the two split-ring resonators 2, 2a, since the capacitance value of the sensor having a high-electron-mobility transistor varies as a function of the quantity of the component to be detected or measured, the transistor can therefore be placed either in the opening of a ring or between the rings, while varying the resonance frequency of the structure formed by the two split-ring resonators 2, 2a.

In this design, a small variation in the capacitance results in a wide frequency shift, which increases the measurement sensitivity of the sensor. It also has the advantage of only requiring contacts between the structure and the sensor.

The invention also relates to an assembly of at least two wireless sensors for detection or measurement, each sensor detecting a respective specific component present in a gaseous or liquid mixture.

According to the invention, said at least two sensors are such as previously mentioned, each of said at least two sensors showing a change in intensity or frequency of resonance as a function of the presence and/or the concentration of the respective specific component of each sensor in the gaseous or liquid mixture. This assembly can therefore specifically detect at least two components present in the gaseous or liquid mixture.

Finally, the invention relates to an exhaust line for an internal combustion engine for a motor vehicle. The exhaust line comprises such a sensor, in which case a component is specifically detected or measured. Alternatively, the line comprises such an assembly of at least two wireless sensors for detection or measurement, in which case two different components are simultaneously specifically detected and measured without mutual interference.

For such an exhaust line, the gaseous or liquid mixture previously mentioned is formed by exhaust gases passing through the exhaust line and said at least one specific component or said at least two specific components, being respectively one or more pollutants contained in the exhaust gases, for example a nitrogen oxide of the NO or $NO_2$ type, which can then be detected or measured in isolation without interference with the other NOx nitrogen oxides or with $NH_3$ ammonia, which adversely affected the previously established detections according to the state of the art.

Figure 3:
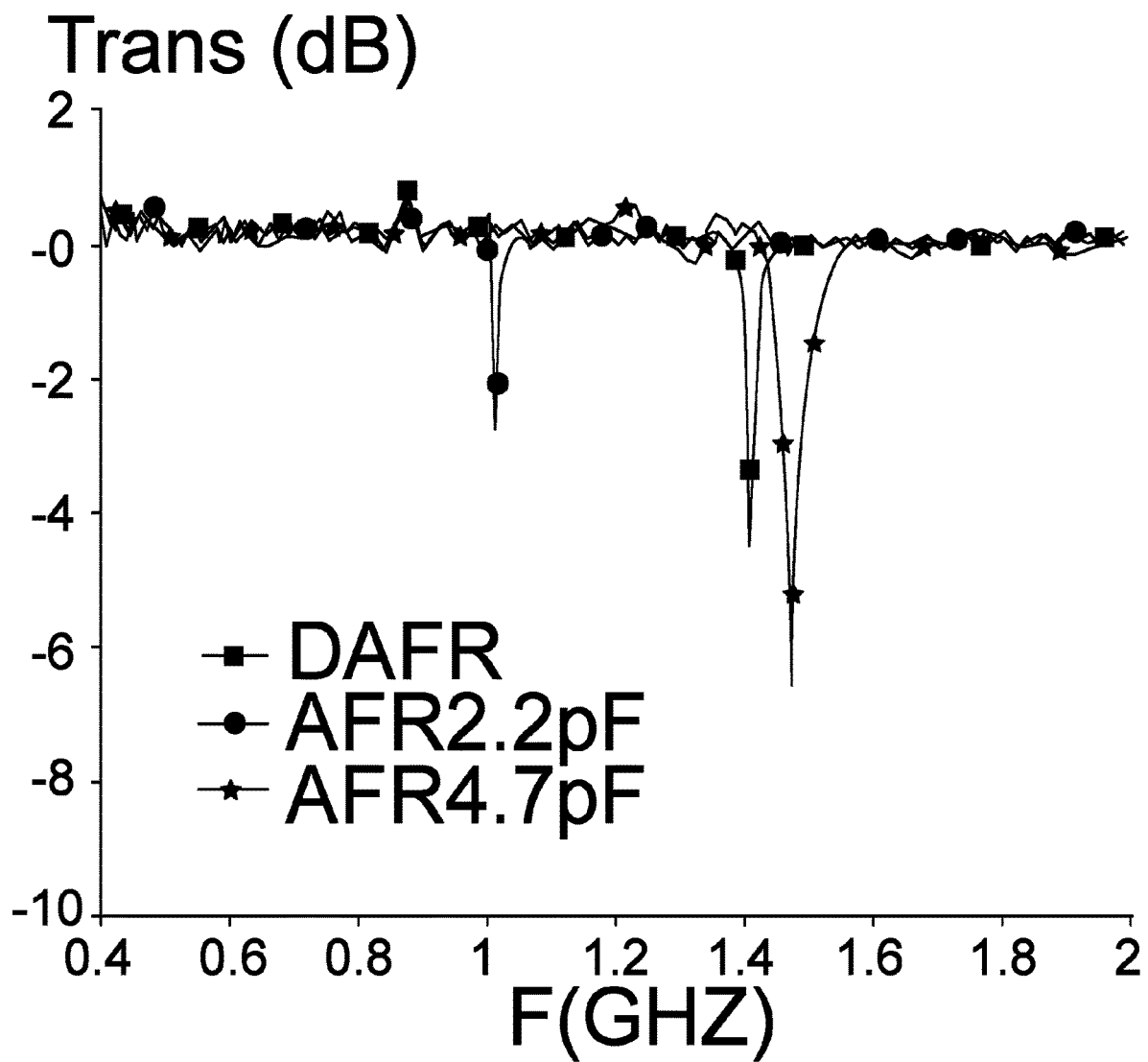
FIG. 3 is a diagrammatic representation of three curves giving the transmission values as a function of the frequencies for a high-electron-mobility transistor, the transistor being associated with a split-ring resonator in two different forms for two curves and with two split-ring resonators for the third curve.

FIG. 3 shows three selective reaction curves of three sensors of different configurations. The y axis shows transmission power Trans in decibels or dB and the x axis, a frequency range F in gigahertz or Ghz. The resonance response of the three sensors DAFR, AFR2.2pF and AFR4.7pF compared is specific to each sensor with higher or lower transmission power values Trans.

The DAFR curve with squares shows a sensor with two split-ring resonators 2, 2a while the other two curves relate to sensors with a single split-ring resonator 2, 2a.

The invention is in no way limited to the embodiments described and shown, which have been given purely by way of example.

What is claimed is:

1. A wireless sensor for detection or measurement of at least one specific component present in a gaseous or liquid mixture, the gas sensor comprising: at least one sensor cell having a high-electron-mobility transistor; said at least one sensor cell being associated with at least one split-ring resonator with at least one respective slit and positioned in said at least one respective slit, wherein the sensor detects a change in the intensity or the frequency of resonance as a function of the presence and/or of the concentration of said at least one specific component in the gaseous or liquid mixture.

2. The sensor according to claim 1, in which the intensity or the frequency of resonance is a function of one or more of the following parameters, alone or in combination:
   when said at least one split-ring resonator has several slits, a number of slits for said at least one split-ring resonator; and
   when the sensor has at least two split-ring resonators, a number and position of the split-ring resonators with respect to one another.

3. The sensor according to claim 1, in which the sensor has at least two split-ring resonators and said at least one sensor cell having a high-electron-mobility transistor is inserted into said at least one slit of one of said at least two split-ring resonators.

4. The sensor according to claim 3, in which said at least one sensor cell having a high-electron-mobility transistor is inserted into said at least one slit of an innermost split-ring resonator of said at least two split-ring resonators.

5. The sensor according to claim 1, in which the sensor has at least two split-ring resonators and said at least one sensor cell having a high-electron-mobility transistor is inserted between said at least two split-ring resonators.

6. The sensor according to claim 5, in which said at least one sensor cell having a high-electron-mobility transistor is concentric with said at least two split-ring resonators.

7. The sensor according to claim 1, in which said at least one sensor cell having a high-electron-mobility transistor is rectangular.

8. The sensor according to claim 1, in which the sensor has at least two concentric split-ring resonators having a common center and said at least one slit of said at least two split-ring resonators is/are aligned according to a diameter of the outermost split-ring resonator of said at least two split-ring resonators, the common center of said at least two split-ring resonators being intercalated, aligned between said at least one slit of the two split-ring resonators.

9. An assembly of at least two wireless sensors for detection or measurement, each sensor detecting a respective specific component present in a gaseous or liquid mixture, said at least two sensors are according to claim 1, each of said at least two sensors showing a change in intensity or frequency of resonance as a function of the presence and/or the concentration of the respective specific component of each sensor in the gaseous or liquid mixture.

10. An exhaust line of an internal combustion engine of a motor vehicle, that comprises a sensor according to claim 1 or an assembly of at least two wireless sensors for detection or measurement, each sensor detecting a respective specific component present in a gaseous or liquid mixture, each of said at least two sensors showing a change in intensity or frequency of resonance as a function of the presence and/or the concentration of the respective specific component of each sensor in the gaseous or liquid mixture, the gaseous or liquid mixture being formed by exhaust gases passing through the exhaust line and said at least one specific component or said at least two specific components being respectively a gas or gases contained in the exhaust gases, in particular NOx gases.

* * * * *